(12) United States Patent
Kaiser et al.

(10) Patent No.: US 10,106,237 B2
(45) Date of Patent: Oct. 23, 2018

(54) EFFICIENCY SUBMERSIBLE THRUSTER

(71) Applicant: Woods Hole Oceanographic Institution, Woods Hole, MA (US)

(72) Inventors: Carl Kaiser, Falmouth, MA (US); Andrew Billings, Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 0 days.

(21) Appl. No.: 15/120,519

(22) PCT Filed: Jun. 24, 2015

(86) PCT No.: PCT/US2015/037548
§ 371 (c)(1),
(2) Date: Aug. 20, 2016

(87) PCT Pub. No.: WO2015/200557
PCT Pub. Date: Dec. 30, 2015

(65) Prior Publication Data
US 2017/0113773 A1    Apr. 27, 2017

Related U.S. Application Data

(60) Provisional application No. 62/017,200, filed on Jun. 25, 2014.

(51) Int. Cl.
*B63G 8/08* (2006.01)
*B63H 21/17* (2006.01)
(Continued)

(52) U.S. Cl.
CPC .............. *B63H 21/17* (2013.01); *B63G 8/08* (2013.01); *H02K 5/132* (2013.01); *H02K 5/1732* (2013.01);
(Continued)

(58) Field of Classification Search
CPC ............ B63H 2005/1258; B63H 23/32; B63H 23/321; B63H 2023/322; B63H 2023/323;
(Continued)

(56) References Cited

U.S. PATENT DOCUMENTS 3,097,317 A * 7/1963 Fechheimer ............. H02K 3/22
310/54
4,445,056 A * 4/1984 Gaylord ................. H02K 5/132
310/54
(Continued)

FOREIGN PATENT DOCUMENTS

EP       1592113 A1     2/2005
WO    2015/200557 A1   12/2015

OTHER PUBLICATIONS

NTN Ball Bearing Catalog,http://www.ntnglobal.com/en/products/catalog/pdf/2202E_b12.pdf, Retrieved Mar. 1, 2017 (Year: 2018).*
(Continued)

*Primary Examiner* — Andrew Polay
(74) *Attorney, Agent, or Firm* — Douglas Denninger

(57) ABSTRACT

A submersible thruster, and methods of optimizing and using same, including selecting a motor with an efficiency of greater than 75 percent when operated at 250 rpm immersed in a pressure-resistant fluid, the motor having a drive shaft with a rotor and a stator matched to the rotor, the rotor and the stator being immersed in the pressure-resistant fluid and being separated by a gap less than or equal to 1 mm. The motor is disposed in a housing to isolate the motor components from a liquid environment. A rear portion of the drive shaft extends through a low-friction shaft seal beyond the housing to drive at least one propeller within the liquid environment. Movement of the drive shaft is constrained to a radial and axial play each of less than 0.75 mm. The method further includes operating the motor at less than 50 percent of peak power, wherein said thruster operates at greater than 30 percent end-to-end thrust efficiency within the liquid environment.

19 Claims, 11 Drawing Sheets

(51) Int. Cl.
*H02K 5/132* (2006.01)
*H02K 5/173* (2006.01)
*H02K 5/22* (2006.01)
*H02K 7/14* (2006.01)
*H02K 21/12* (2006.01)
*B63B 35/00* (2006.01)
*B63G 8/00* (2006.01)

(52) U.S. Cl.
CPC ............... *H02K 5/225* (2013.01); *H02K 7/14* (2013.01); *H02K 21/12* (2013.01); *B63B 2035/008* (2013.01); *B63B 2702/04* (2013.01); *B63B 2755/00* (2013.01); *B63G 2008/004* (2013.01)

(58) Field of Classification Search
CPC ............ B63H 2023/325; B63H 23/326; B63H 2023/327; H02K 5/132; H02K 9/19; B63G 8/08
See application file for complete search history.

(56) References Cited

U.S. PATENT DOCUMENTS

| | | | | |
|---|---|---|---|---|
| 4,587,722 A | * | 5/1986 | Miller | .................. H02K 1/185 29/596 |
| 5,101,106 A | * | 3/1992 | Cox, Jr. | ............... G01R 31/016 250/316.1 |
| 5,117,141 A | * | 5/1992 | Hawsey | .................. B63H 5/10 310/114 |
| 5,229,677 A | * | 7/1993 | Dade | ..................... H02K 5/173 310/112 |
| 5,319,269 A | | 6/1994 | Bryant | |
| 5,698,916 A | | 12/1997 | Eguchi | |
| 5,716,247 A | * | 2/1998 | Ogino | .................. B63H 20/245 440/75 |
| 5,796,197 A | | 8/1998 | Bookout | |
| 7,971,650 B2 | | 7/2011 | Yuratich | |
| 8,157,604 B2 | | 4/2012 | Kotlyar | |
| 2003/0060094 A1 | * | 3/2003 | Motsenbocker | ......... B63H 1/28 440/6 |
| 2003/0186601 A1 | | 10/2003 | Collier | |
| 2005/0204992 A1 | | 9/2005 | Shelton | |
| 2010/0314957 A1 | * | 12/2010 | Wellman | ................. B63G 8/32 310/87 |
| 2011/0309726 A1 | * | 12/2011 | Carpenter | ............. H02K 1/182 310/75 R |
| 2015/0159475 A1 | * | 6/2015 | Prieto | .................... H02K 5/132 166/66.4 |
| 2015/0274271 A1 | * | 10/2015 | Brautaset | ............... B63H 23/24 416/147 |

OTHER PUBLICATIONS

DOE Motor Challenge Fact Sheet, https://www.energy.gov/eere/amo/downloads/determining-electric-motor-load-and-efficiency, retrieved Mar. 1, 2017 (Year: 1997).*

* cited by examiner

SECTION R-R

SECTION T-T

EFFICIENCY SUBMERSIBLE THRUSTER

CROSS-REFERENCE TO RELATED APPLICATION

This application is a national phase filing under 35 USC § 371 of international application No. PCT/US2015/037548 filed 24 Jun. 2015, which claims priority to U.S. Provisional Application No. 62/017,200 filed 25 Jun. 2014. The entire contents of each of the above-mentioned applications are incorporated herein by reference.

FIELD OF THE INVENTION

The invention relates to propulsion systems for marine vehicles, more specifically, to high-efficiency electric thrusters for underwater use.

BACKGROUND OF THE INVENTION

A marine thruster is a transversal propulsion device built into or mounted on a ship, boat or underwater vehicle. Thruster-based propulsion is relied upon for station keeping, attitude control, and other special propulsion needs. Submersible vehicles such as those used for subsea research and other marine operations may employ one or more thrusters as their principal form of propulsion and maneuverability. Thrusters on such are often powered by electric motors, but space and weight capacity may place constraints on allowable battery size or weight. Thus, in order to maximize the time the vehicles may remain submerged and operating, power conservation is an important consideration. Accordingly, it is desirable to produce high efficiency thrusters which consume less power than those previously known in the art.

The battery powered electric motors used in thrusters for submerged marine applications generally comprise a Rotor/Stator combination. The rotor is the revolving, typically inner portion of an electric motor. It turns due to torque generated as a result of the induction of a fluctuating magnetic field as current flows through surrounding stator windings. In actual operation, the rotor speed always lags the magnetic field's speed, causing the rotor bars and/or surfaces to cut magnetic lines of force and produce useful torque. The difference between the synchronous speed of the magnetic field and the shaft rotating speed is slip, and can be expressed as a differential RPM (revolutions per minute) or frequency.

There are a number of factors which cause losses in efficiency. Windage and friction losses may dominate power loss in certain constructions. Power loss in some induction motors is largely but not entirely proportional to the square of the slip and may be reduced by decreasing the degree of slip for a given load. Implementation of such efficiencies has traditionally been accomplished by increasing the mass of the rotor conductors (conductor bars and end-plates) and/or increasing their conductivity and to a lesser extent by increasing the total magnetic field across the gap between rotor and stator.

The stationary part of an electric motor is referred to as the stator. While various designs and geometries exist, exemplary stators have a rigid (usually steel) frame enclosing a hollow cylindrical core (often made up of laminations of silicon steel to reduce hysteresis and eddy current losses). The stator may be either a permanent magnet or an electromagnet.

Energy is provided to the stator though wrapped wire known as the field coil or field windings. The wire of the windings is generally laid in coils wrapped around core of the stator to form magnetic poles in response to current flow through the wire. Commutation, or polarity reversal of the coils, may be effected through electromechanical means or through commutated induction and permanent magnet motors.

The space between the rotor and stator in the assembled motor is known as the gap. In non-liquid-filled motors, the gap is often referred to as the "air gap". It is preferred that the gap between the rotor and stator be as small as possible to minimize slip. However, to the extent that the rotor may wobble (e.g. not define a perfect circle) as it turns, the gap must be wide enough to ensure physical contact does not occur between the rotor surface and the stator. A too-large gap distance may have a strong negative effect on motor efficiency.

The efficiency of a motor is determined by intrinsic losses that can potentially be minimized through appropriate motor design. Intrinsic efficiency losses are of two types: fixed losses, which are independent of motor load, and variable losses, which are dependent on load. Fixed losses include magnetic core, friction and windage losses. Magnetic core losses (sometimes called iron losses) consist of eddy current and hysteresis losses in the stator. They vary with the core material and geometry and with input voltage. Friction and windage losses are caused by friction in the bearings of the motor and aerodynamic losses associated with part rotation.

Variable losses include resistance losses in the stator and in the rotor and miscellaneous stray losses. Resistance to current flow in the stator and rotor results in heat generation that typically is proportional to the resistance of the material and the square of the current ($I^2 R$). Stray current losses arise from a variety of sources and are difficult to either measure directly or to calculate, but are generally proportional to the square of the rotor current. Part-load performance characteristics of a motor also depend on its design. Both motor efficiency η and power factor PF fall to very low levels at low loads.

Marine thruster efficiency is commonly expressed in terms of the amount of useful work capable of being performed for a given amount of energy input; work is defined as force times distance, where force may be measured in linear (e.g. forward motion or velocity) terms or as torque. For the purpose of this disclosure, "end-to-end efficiency" is defined as work done for the amount of electric power input.

Submerged marine vehicles for commercial, research and/or military use, such as AUVs (autonomous underwater vehicles) or ROVs (remotely operated vehicles), are often operated at speeds ranging from approximately 10 centimeters per second up to about 4.5 meters per second. Typical end-to-end efficiencies of marine thrusters for AUV/ROVs seldom exceed peak values of 40 percent at any point in the entire rpm/velocity range. Values are generally on the order of 20 percent or less with peak values only occasionally exceeding 35 or 40 percent for discrete portions of the velocity range. Curves 12 and 14, FIG. 6, are depictions of typical thruster end-to-end efficiencies across the rpm/velocity range. As described in more detail below, curve 16 is representative of the surprising and unexpected end-to-end efficiency according to the present invention.

Historical approaches to extending mission endurance for battery powered vehicles often employed either small diameter brushless DC thrusters with gear-boxes (Whitcomb et al., Navigation and Control of the Nereus Hybrid Underwater Vehicle for Global Ocean Science to 10,903 m Depth: Preliminary Results. In Proceedings of the 2010 IEEE International Conference on Robotics and Automation; Gomez-Ibanez et. al., Energy Management for the Nereus Hybrid Underwater Vehicle, in *Oceans* 2010, IEEE), or used large diameter direct drive disk motors. Each approach has specific drawbacks. Small diameter brushless motors and gear-boxes may suffer from windage losses if run in oil. When designed for low pressure operation (1 atmosphere), small-diameter brushless motors and gear-boxes often require heavy housings and magnetic clutches. Such thrusters are often acoustically noisy and gear-boxes are a source of unreliability. Disk motors, on the other hand, are only useful when their larger size (disk rotors are generally greater than 6 inches in diameter, especially for higher torque applications) is acceptable, such as in single thruster applications for large diameter torpedo-shaped vehicles.

Accordingly, it is desirable to produce low-profile thrusters with improved efficiency and reduced power consumption compared to those known in the art.

SUMMARY OF THE INVENTION

The inventive direct drive thrusters described herein operate at heretofore unreached end-to-end power efficiencies across a range of typically useful velocities through a liquid environment such as seawater. Efficiencies are achieved through the use of a direct drive assembly with a matched cylindrical rotor/stator pair having an optimal gap between them, a pressure-resistant fluid within the gap, and the absence of a gear box.

This invention features a method of increasing the efficiency of a thruster submersible in a liquid environment, including selecting an electric motor with an efficiency of greater than 75 percent when operated at 250 rpm immersed in a pressure-resistant fluid, the motor having a drive shaft with a rotor and a stator matched to the rotor, the rotor and the stator being immersed in the pressure-resistant fluid and being separated by a gap less than or equal to 1 mm. The motor is disposed in a housing to isolate the motor components from the liquid environment. A rear portion of the drive shaft extends through a low-friction shaft seal beyond the housing to drive at least one propeller within the liquid environment. Movement of the drive shaft is constrained to a radial and axial play each of less than 1.0 mm for each. The method further includes operating the motor at less than 50 percent of peak power, wherein said thruster operates at greater than 30 percent end-to-end thrust efficiency within the liquid environment.

In some embodiments, the drive shaft is supported by at least three bearings, with at least one bearing supporting the drive shaft in front of the rotor and at least two bearings supporting the drive shaft behind the rotor. In certain embodiments, at least first and second thrust bearings support the drive shaft behind the rotor, wherein each bearing is disposed adjacent to the motor, and the first and second thrust bearings are separated from each other by less than 1 cm. In one embodiment, the bearings are positioned to prevent fore and aft movement of the drive shaft and thereby to reduce efficiency loss. In some embodiments, the pressure-resistant fluid is a non-electrically conductive oil and, in other embodiments, the rotor and the stator include windings, the pressure-resistant fluid is an electrically conductive oil, and the windings include an electrically non-conductive coating.

In a number of embodiments, the thruster operates at an end-to-end efficiency of greater than 30 percent at velocity ranges from 0.1 meters per second to greater than 2.0 meters per second through the liquid environment. Preferably, the thruster is carried by a vehicle selected from the group including a Remotely Operated Vehicle, an Autonomous Underwater Vehicle, a Hybrid Remotely Operated Vehicle, a submarine, a mini-submarine, a submarine simulator decoy, and a torpedo decoy, wherein the vehicle is capable of being operated with a thruster efficiency of at least 30 percent across a velocity range of 0.1 meters per second to 3 meters per second.

In some embodiments, the rotor has a ratio of length to diameter of greater than 2:1. In certain embodiments, the method further includes, during assembly of the thruster, thermally altering at least one dimension of at least one of (i) at least a portion of the housing and (ii) the stator to establish a shrink fit of the housing about the stator. In one embodiment, the stator of the motor comprises a heavy copper winding of heavy-gauge, relatively large-diameter copper wire to reduce eddy currents. In a number of embodiments, the electric motor is a brushless DC motor with an efficiency of greater than 75 percent when operated at 250 rpm in oil. Preferably, a pressure compensation assembly automatically adjusts the pressure on the pressure-resistant fluid, such as a spring-loaded bladder within the housing that maintains the pressure-resistant fluid at a positive pressure relative to the liquid environment.

This invention also features an improved efficiency thruster submersible in a liquid environment, including an electric motor with an efficiency of greater than 75 percent when operated at 250 rpm immersed in a pressure-resistant fluid, the motor having a rotatable drive shaft with a rotor and a stator matched to the rotor, the rotor and the stator being immersed in the pressure-resistant fluid and being separated by a gap. The thruster further includes a watertight housing accommodating the motor and isolating the pressure-resistant fluid from the liquid environment. At least one low-friction shaft seal carries the drive shaft and enables it to extend distally beyond the housing while isolating a proximal remainder of the drive shaft and the pressure-resistant fluid from the liquid environment. At least one thrust bearing supports the drive shaft. A propeller is capable of being rotatably driven by the drive shaft within the liquid environment. Preferably, movement of the drive shaft is constrained with radial and axial play each of less than 1.0 mm, that is, each direction of possible radial and axial movement of the drive shaft is constrained to be less than 1.0 mm, preferably less than 0.75 mm. Further, the rotor has a ratio of length to diameter of greater than 2:1, and the gap between the rotor and matched stator is less than or equal to 1 mm.

In some embodiments, the drive shaft is supported by at least three bearings, with at least one bearing supporting the drive shaft in front of the rotor and at least two bearings supporting the drive shaft behind the rotor. In one embodiment, the pressure-resistant fluid is a non-electrically conductive oil, and the thruster operates at an end-to-end efficiency of greater than 30 percent at velocity ranges from 0.1 meters per second to greater than 2.0 meters per second through the liquid environment. In certain embodiments, the motor is a brushless DC motor with an efficiency of greater than 75 percent when operated at 250 rpm in oil, and a spring-loaded bladder within the housing maintains the pressure-resistant fluid at a positive pressure relative to the liquid environment. Preferably, the thruster is carried by a vehicle selected from the group including a Remotely Operated Vehicle, an Autonomous Underwater Vehicle, a Hybrid Remotely Operated Vehicle, a submarine, a mini-submarine, a submarine simulator decoy, and a torpedo decoy, wherein the vehicle is capable of being operated with a thruster efficiency of at least 30 percent across a velocity range of 0.1 meters per second to 3 meters per second.

This invention further features a method of increasing the efficiency of a thruster submersible in seawater, including selecting a DC electric brushless motor with an efficiency of greater than 75 percent when operated at 250 rpm immersed in a pressure-resistant fluid, the motor having a drive shaft with rotor and a stator matched to the rotor, the rotor and the stator being immersed in the pressure-resistant fluid and being separated by a gap, the motor being disposed in a housing to isolate the pressure-resistant fluid from the seawater, and a rear portion of the drive shaft passing through a Crane seal and a seawater-wetted bearing and extending beyond the housing to drive at least one propeller within the seawater. The method further includes constraining the movement of the drive shaft to a radial and axial play each of less than 0.75 mm for each and reducing the gap between the rotor and matched stator to less than or equal to 1 mm. The motor is operated at less than 50 percent of peak power, wherein said thruster operates at greater than 30 percent end-to-end thrust efficiency.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

This invention may be accomplished by a method of increasing the efficiency of a thruster submersible in a liquid environment (e.g. seawater or fresh water), including selecting a motor with an efficiency of greater than 75 percent when operated at 250 rpm immersed in a pressure-resistant fluid, the motor having a drive shaft or other force-transmission and connecting mechanism with a propulsion unit, with a rotor and a stator matched to the rotor, the rotor and the stator being immersed in the pressure-resistant fluid and being separated by a gap less than or equal to 1 mm. The motor is disposed in a housing to isolate the pressure-resistant fluid from the liquid environment. A rear portion of the drive shaft extends through a low-friction shaft seal beyond the housing to drive at least one propeller within the liquid environment. Movement of the drive shaft is constrained to a radial and axial play each of less than 0.75 mm for each. The method further includes operating the motor at less than 50 percent of peak power, wherein said thruster operates at greater than 30 percent end-to-end thrust efficiency within the liquid environment.

This invention may also be expressed as a thruster including a direct drive assembly or other suitable motor assembly with an output shaft carrying a rotor at a first region and carrying a propulsion unit with at least one propeller blade, preferably at least two propeller blades, at a second region. A stator surrounds the rotor and defines a gap therebetween. A pressure compensation assembly includes a pressure-resistant fluid disposed in the gap and a resilient member such as a bellows diaphragm to enable automatic pressure adjustment of the pressure-resistant fluid with ambient pressure (e.g. atmospheric pressure, hydrostatic pressure).

Figure 3:
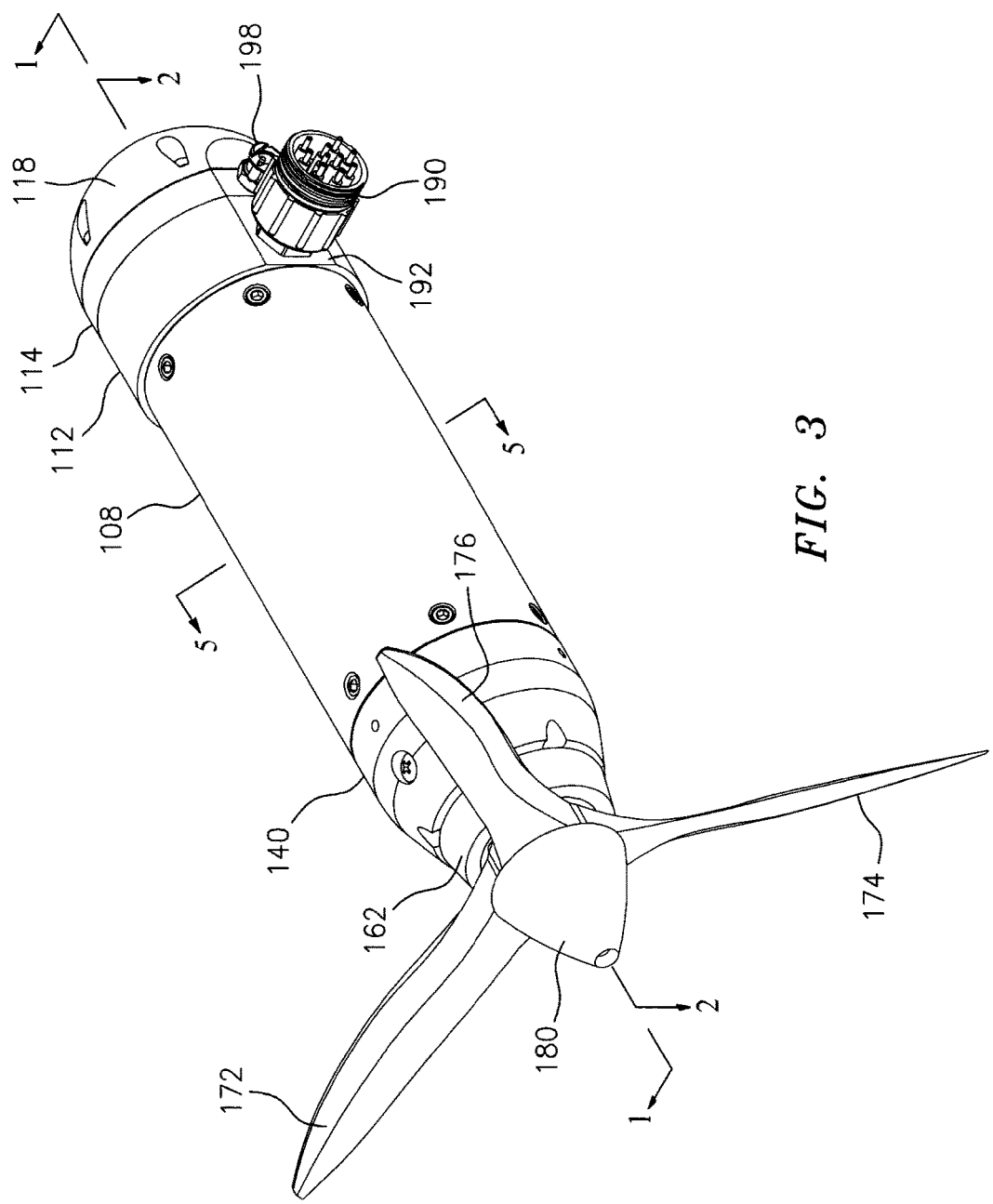
FIG. 3 is a schematic perspective view of the thruster of FIGS. 1-5.
Figure 4:
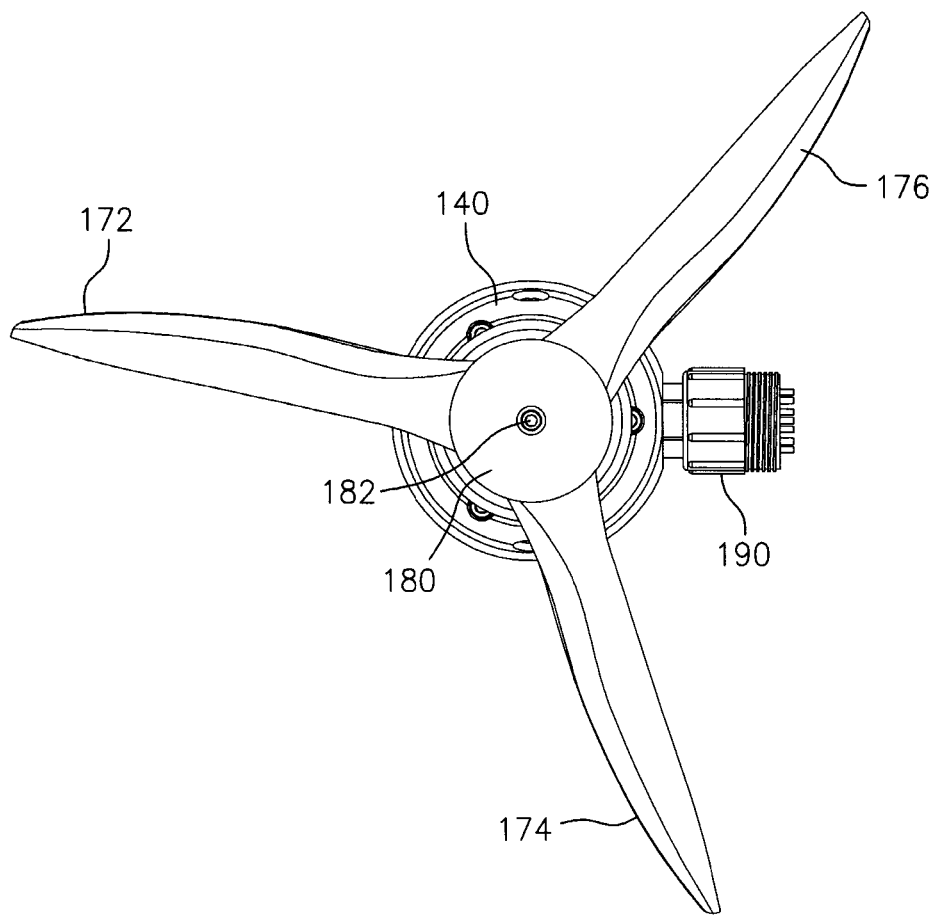
FIG. 4 is a schematic rear view of the thruster of FIGS. 1-5.
Figure 5:
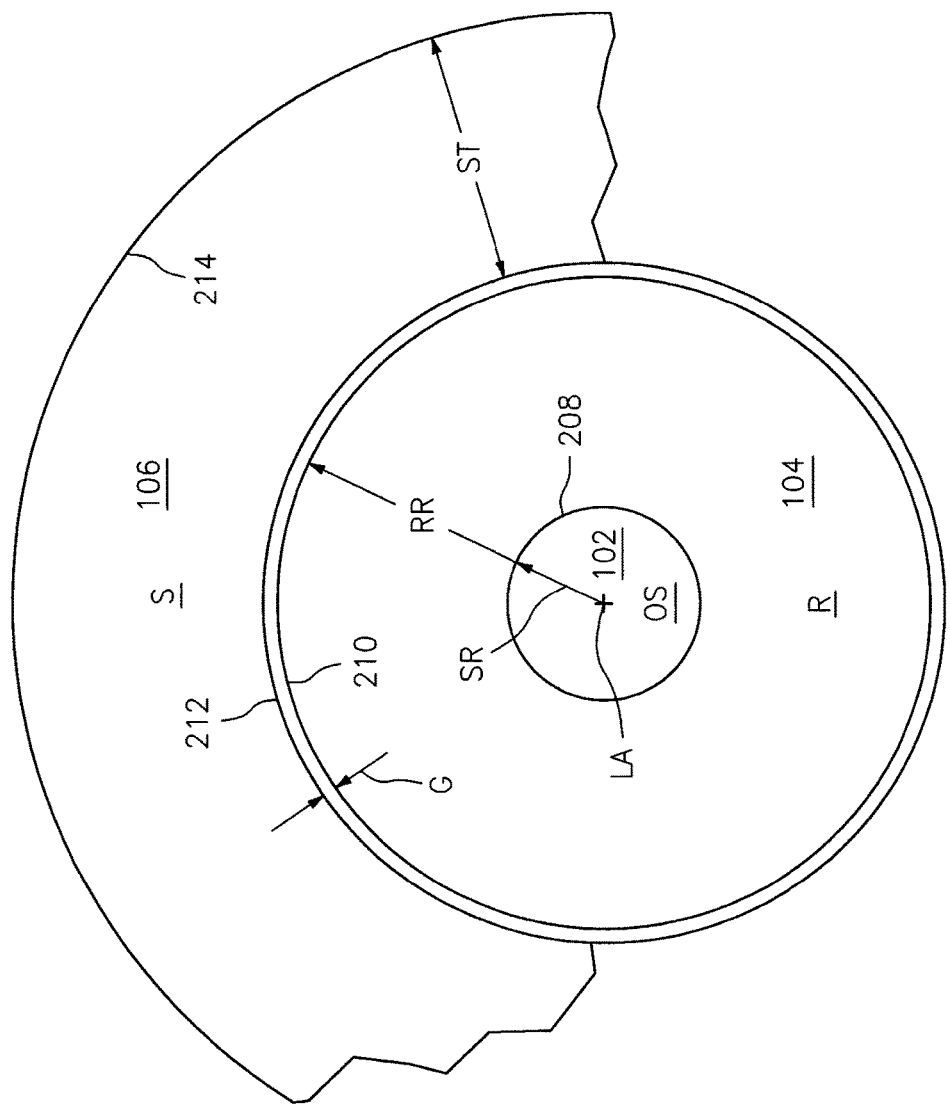
FIG. 5 is a schematic partial cross-sectional view, along lines 5-5 of FIG. 3, of the thruster of FIGS. 1-5.

Thruster 100 according to the present invention, FIGS. 1-5, has a direct drive assembly 101 with an output shaft 102, also referred to as a drive shaft 102, carrying a rotor 104 at a first region and carrying a propulsion unit 103 at a second region of the shaft 102. A stator 106, secured in a stationary manner relative to a cylindrical housing 108 and a conductive housing grounding ring 107, surrounds the rotor and defines a gap G between stator S and rotor R, as best illustrated in FIG. 5 and described in more detail below.

Figure 1:
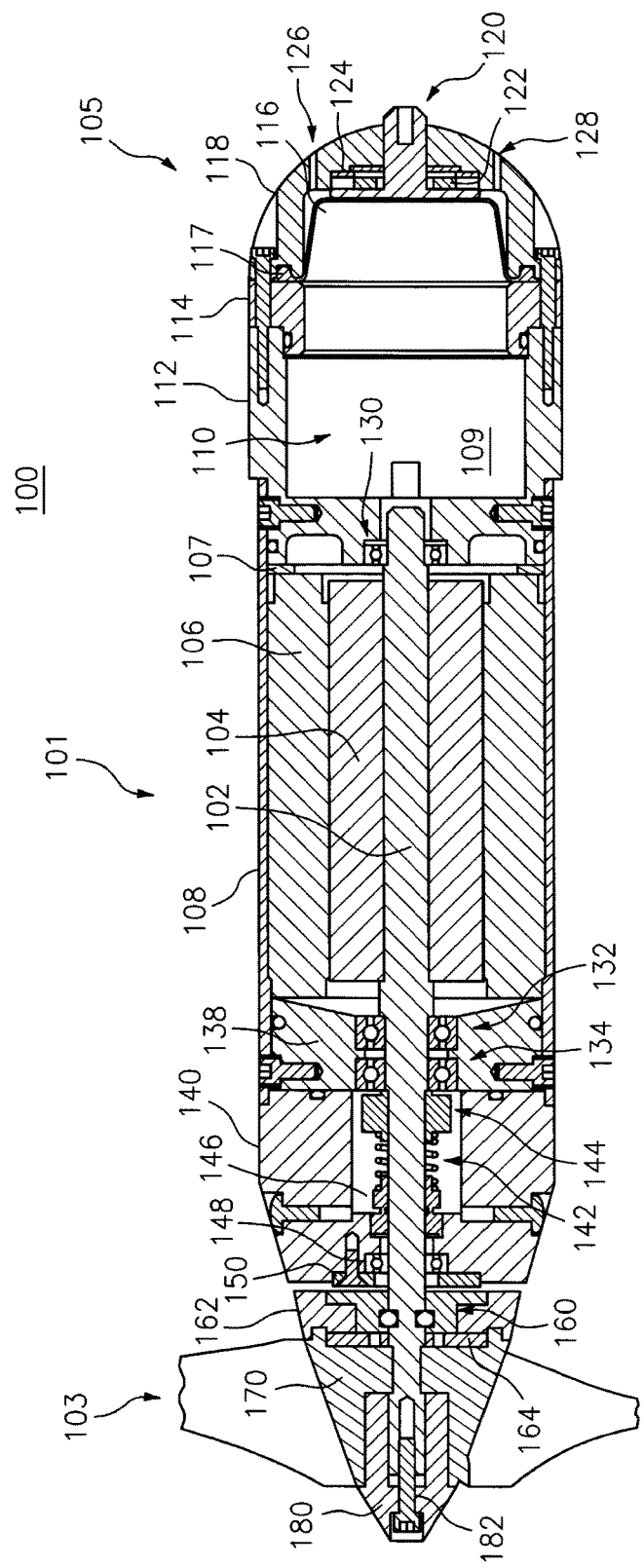
FIG. 1 is a schematic cross-sectional view, along lines 1-1 of FIG. 3, of a thruster according to the present invention as illustrated in FIGS. 1-5.
Figure 2:
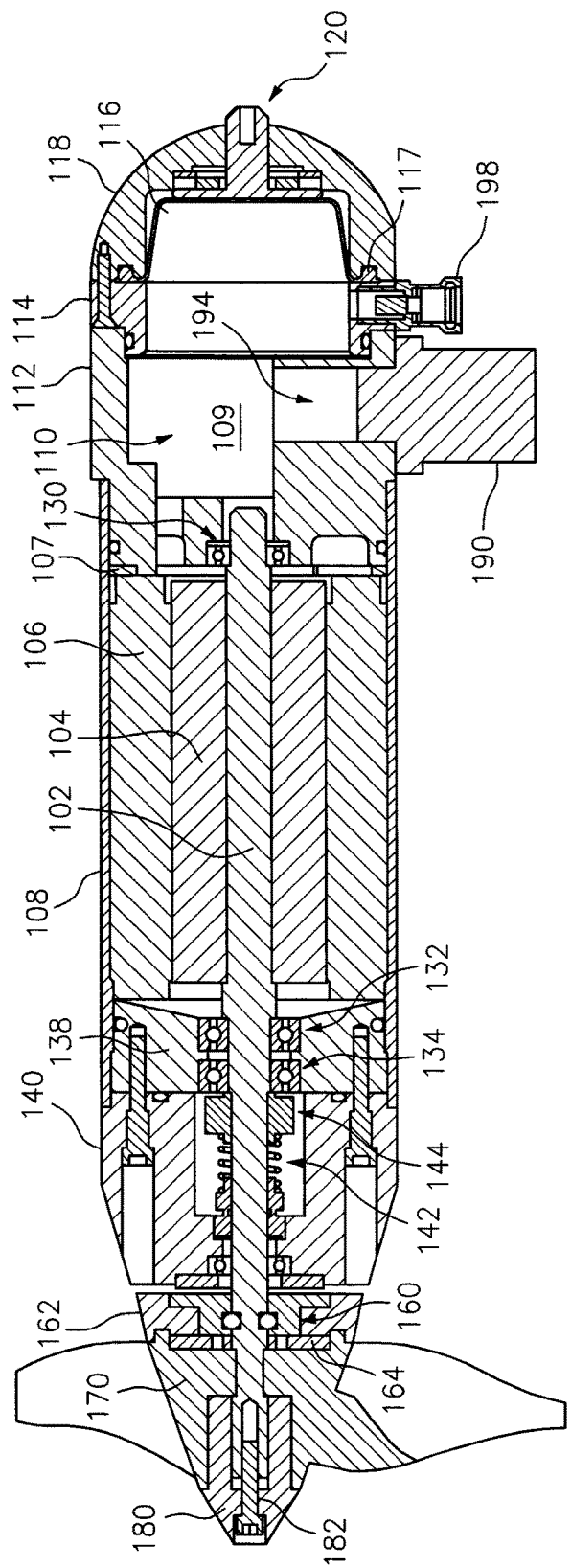
FIG. 2 is a schematic cross-sectional view, along lines 2-2 of FIG. 3, of the thruster of FIGS. 1-5.

A pressure compensation assembly 105, FIGS. 1-3, includes pressure-resistant fluid 109 disposed in the gap and in a chamber 110, and a resilient member such as a bellows diaphragm 116 or other suitable mechanism to enable automatic pressure adjustment with ambient pressure. Preferably, a spring-loaded bladder-type mechanism maintains a slight positive pressure relative to the liquid environment surrounding the thruster. In this construction, chamber 110 is defined by a control side bearing support 112, a control side end cap 114, and by space within a bellows housing 118 that is aft (to the rear) of bellows diaphragm 116. A rib 117 of bellows diaphragm 116 is captured between end cap 114 and bellows housing 118.

A piston plunger 120, movable by ambient pressure, has a flange which abuts a portion of the forward (front) portion of diaphragm 116. A small spring retainer 122, fastened to the flange of piston 120, is movable relative to large spring retainer 124. Preferably, bellows housing 118 defines a plurality of pressure equalization passages such as bores 126 and 128, FIG. 1, which enable the front surface of the diaphragm 116 to experience ambient pressure.

Shaft 102 is rotatably supported by bearings 130 within control side bearing support 112 and by bearings 132 and 134 within an output side bearing support 138. An output cone 140 surrounds a seal spring 142 which is biased between a bearing-and-seal support 144 and a Crane seal 146. The present inventors have found that a Crane mechanical seal is very low friction, very reliable, cost-effective, and performs significantly better than magnetic coupling and o-ring seal assemblies, especially in dynamic situations where the shaft rotation is frequently reversed to change thrust direction for the thruster. In other constructions, other mechanical seals (e.g. shaft seals, lip seals, stuffing box, cartridge seal) suitable for rotating shafts capable of resisting leakage and limiting friction are utilized.

Output cone 142 further carries an output bearing 148, also referred to as thrust bearing 148, held by an output bearing retainer 150. In one construction, bearing 148 is a seawater-wetted ceramic bearing which enables robust propeller support. Preferably, it also increases efficiency by eliminating extraneous motion of the output shaft in the vicinity of the propeller.

Propulsion unit 103 includes a propeller inner split clamp 160 within a faring 162 and a mount plate 164. In this construction, output cone 170 carries three propeller blades 172, 174 and 176, FIGS. 3-4. Nose cone 180 is fastened to the proximal end of output shaft 102 by a fastener 182.

A SubConn locking sleeve 190, FIGS. 2-4, mates against flat surface 192 and into opening 194 defined by control side bearing support 112. Stator 106 is energized by electrical power provided through sleeve 190. Also provided are 3-phase for a Hall-effect sensor plus power and ground for other sensors. Any power source appropriate to power the electric thruster motor may be connected to the thruster via a controller or similar device. In most submersible applications the power source is a direct current battery.

Control side end cap 114 carries a fitting 198 for compensation fluid addition or removal. In one construction, housing 108 has an outer diameter of approximately 4.0 inches and a length of approximately 8.5 inches. Control side bearing support 112, described in more detail below in relation to FIGS. 9A-9E, has an outer diameter of approximately 4.25 inches and a length of approximately 3.25 inches. Overall weight in water is approximately 14 lbs. The inventive thrusters generate power up to 2 or even 3 KW. Typical values in use with ROVs and AUVs are from 100 to 240 or 300 watts. In other constructions, the outer diameter of the housing 108 is less 4.0 inches, less than 10 inches, less than 20 inches, or less or equal to 50 inches. In some constructions, the length of the housing 108 is less than 8.5 inches, less than 20 inches, less than 30 inches, or in particular cases greater or equal to 50 inches or more.

While many of the components are formed of a highly corrosion-resistant materials such as titanium, steel, stainless steel alloy (e.g. A286 Super Alloy), aluminium, iron, copper, mechanical grade plastics (e.g. thermoplastics), composites, fiberglass, etc., in one construction the housing 108 is formed of aluminium-6061 alloy, and the following components are formed of a high strength, low moisture absorbing polymer (e.g. Acetal Copolymer (Black grade), acetal homopolymer, polyoxymethylene, carbon fiber) or similar material: output side bearing support 138, output cone 140, bellows housing 118, control side end cap 114, control side bearing support 112, and fairing 162. Acetal polymers are tough, resistant to oil, non-porous, and resistant to fracture due to temperature changes, although other materials may be suitable as known to those of skill in the art.

Output shaft 102 preferably is formed of Nitronic 60 alloy or other high performance alloy and must fit all bearings and appropriately contact the rotor. The shaft 102 typically has one or more steps, or step flair, such as near bearings 132 and 134; the changes in diameter assist maintenance of axial positioning of shaft 102. Preferably, the bearing arrangement (i) supports the shaft at both ends of the shaft, especially fore and aft of the rotor, via ball bearings and (ii) resists thrust, especially when bearings 132, 134 are two co-located angular contact ball bearings that serve as thrust bearings. Close proximity, preferably being separated by less than one cm, enables the thruster bearings to be tolerant of the differences of thermal coefficient of expansion of the various materials of the thruster components. This enables the thruster to experience large temperature changes without binding between components.

The output shaft 102, rotor 104 and stator 106 are depicted schematically in lateral cross-sectional view in FIG. 5 as output shaft OS, rotor R and stator S. Output shaft OS has a shaft radius SR, shown by an arrow beginning at longitudinal axis LA and extending to the inner surface 208 of rotor R, and rotor R has a rotor radius RR, also measured from longitudinal axis LA, to the outer surface 210 of rotor R. Stator S has a stator thickness ST extending between an inner surface 212 to an outer surface 214. Gap G is defined between the outer surface 210 of rotor R and the inner surface 212 of stator S. The Gap G preferably ranges from 0.010 inch to 0.030 inch, more preferably from 0.015 inch to 0.025 inch, and most preferably about 0.020 inch about the entire circumference of rotor R. In some constructions, Gap G defines less than 0.010 inch.

More generally, the invention described herein features novel high efficiency submersible thrusters meant primarily for aquatic use. The inventive thrusters comprise an electrical motor and are direct drive, having no gear box between rotor and the propeller. The high efficiencies of the thruster are achieved through the use of a uniquely dimensioned cylindrical rotor/stator pair with an optimal gap between them, and a pressure resistant fluid within the gap.

The thrusters described herein are meant to be used on any aquatic vehicle (e.g. surface vessel, submarine vessel), but preferably on vehicles which submerge within aquatic environments, retaining functionality at full ocean depths of up to 11,000 meters (e.g. up to 100 meters, up to 500 meters, up to 1,000 meters, up to 2,000 meters, up to 4,000 meters, up to 6,000 meters, up to 8,000 meters, up to 10,000 meters), and provide heretofore unachieved combination of form factor, operating speed and power efficiencies. Test data across the range of useful velocities and/or RPM depicted in FIGS. 6 and 8A-8C, described in more detail below, has shown peak efficiencies of 30 to 40 percent or higher even with the inclusion of losses from motor controllers and propellers.

Figure 6:
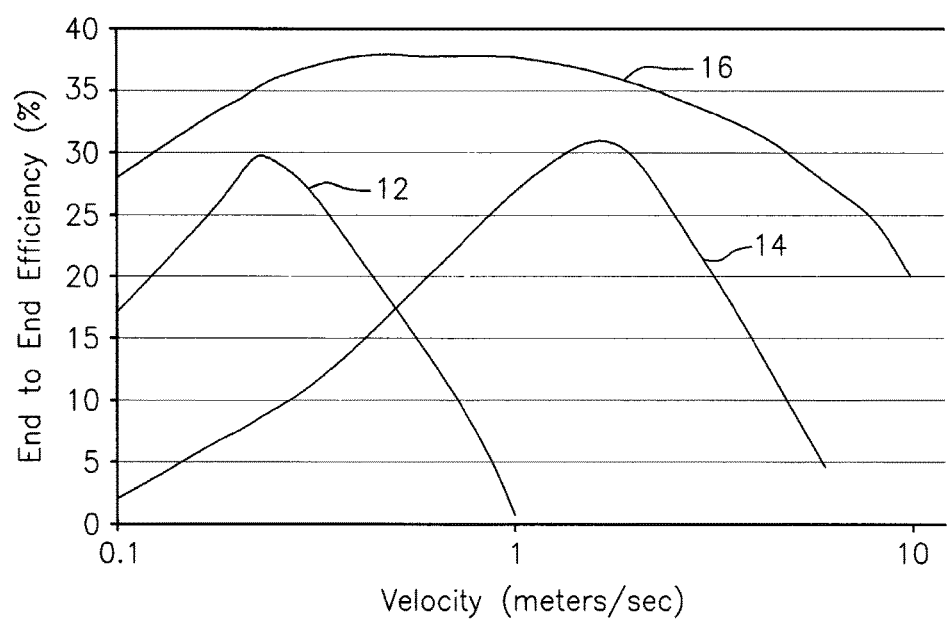
FIG. 6 is a graph of typical prior art efficiency curves 12 and 14 as compared to a representative efficiency curve 16 of a thruster according to the present invention.

For example, curve 16, FIG. 6, exhibits approximately 28 percent efficiency at a velocity of 0.1 m/sec, exceeding 35 percent efficiency over Thrusters fitted with matched propellers are expected to reach peak efficiencies of 35 to 55 percent, and in some embodiments 45 percent to 58 percent and, in other embodiments, 50 percent to 55 percent. FIG. 6 is a qualitative comparison of thruster efficiencies across the useful vehicle velocity range. Typical efficiency curves 12 and 14 are compared to the efficiency curve 16 of the inventive thrusters. The inventive thrusters maintain end-to-end efficiency across a wider range of velocities (or RPMs) than other thrusters known to the art. Typical AUV/ROV speeds: hovering 0.25 m/s; Survey and transit 1-2 m/s; Sprint and/or fast transit >2 m/s. The inventive thrusters are also rugged and can withstand severe stresses such as being driven, propeller first, at full speed into blocks of floating ice.

The inventive electrically powered thrusters generally have an electric motor disposed within a water-proof housing attached by an integrated drive shaft to the outer surface of the vehicle to be propelled. The thrusters further comprise a motor controller, drive shaft seals and couplings, and a propeller, but generally have no gearing mechanism located at any point in the drive train. Thrusters of the invention are generally connected to a remote power supply and a controller as well as other electric connection components for operating the motor, although some embodiments contemplate a battery within or attached to the thruster housing. The thrusters operate in both directions, that is, they are fully reversible.

The drive motors of the inventive thrusters further comprise high surface area, cylindrical rotors with length-to-diameter aspect ratios of at least 1, and are preferably oblong with a ratio greater than 1. In preferred embodiments the length-to-diameter aspect ratios are greater than 2, often 4, 5, or 8, and in some embodiments aspect ratios of greater than 20 are utilized. Preferred aspect ratio ranges include 1 to 20, preferably 1 to 15, and more preferably 2 to 10. As rotor length-to-distance aspect ratios change, the Gap G preferably remains substantially constant. The oblong rotors have a high rotor surface area to rotor volume ratio, allowing for a lower total rotor weight relative to the total inductive surface area, and a relatively lower contribution of rotor weight to frictional drag losses. In order to utilize the oblong rotors of the invention, care must be taken to minimize rotor wobble to less than the distance of the gap between rotor and stator surfaces.

The motors of the inventive thrusters most often dispose the rotor and stator within a non-conducting pressure-resistant fluid (e.g. a mineral oil, a synthetic oil, a natural oil, a composition of oils, or hydraulic fluid) to isolate the electrical systems from water, prevent shorting across the gap and allow for pressure equalization between the internal and external aspects of the thruster. Pressure-resistant fluid surrounds the seal spring 142, FIGS. 1 and 2, and related components. In some constructions, a bladder forms the aft seal for the pressure-resistant fluid. The liquids used within the motors of the inventive thrusters are selected for the ability to maintain appropriately low viscosities across the wide range of temperatures and pressures encountered in subsea operations. It is also desirable that the pressure-resistant fluid be ecologically friendly in case of accidental leakage or release. In some embodiments fluids are chosen for their high lubricities to further minimize drag and promote longevity of bearings and seals.

Typical preferred pressure-resistant fluids, also referred to as working fluids, have compressibility of less than ten percent, preferably less than five percent, and more preferably less than one percent per thousand meters seawater, although in some embodiments more compressible fluids are used in conjunction with pressure compensation systems. Suitable fluids have a high lubricity and minimal electrical conductivity. Exemplary pressure resistant fluids include Royal Purple #7 hydraulic fluid and mineral oil. Royal Purple #7 exhibits very little viscosity change due to changes in temperature and/or pressure.

Efficiency gains for thrusters utilized according to the present invention are enhanced due to low viscosity of the working fluid and lower rotational speed of the motor. Because frictional losses increase dramatically with increase in rotational speed, it is a realization of the present invention that it is preferred to select all parts of the thruster, including the rotor of the motor, to operate at relatively low rotational speeds while still providing adequate thrust in both forward and reverse directions. Reliability and efficiency are also improved by reducing complexity of the thruster system, such as by omitting a gear box or other gearing system which further reduces power drain, internal vibration, and acoustic noise generation. The feature of low noise generation from the thruster makes the system well-suited for vehicles utilizing sonar or acoustic communications. Motors utilized according to the present invention need to be physically large and typically weigh more than equivalent conventional motors with gear boxes. However, thruster efficiency is dramatically increased by the present invention, frequently by more than 50 percent and often by 100 percent (that is, efficiency is at least doubled) relative to conventional thrusters. The extra mass of the present thrusters is easily recovered by weight savings due to significantly smaller battery requirements while achieving equivalent thrust relative to conventional thrusters.

The electric motors of the invention are assembled in some constructions from frameless motor kits with factory-built windings, a small diameter and long length rotor, and corresponding stator (e.g. from Allied Motion Technologies, Inc. of Amherst, N.Y.) such as Emoteq HT (High Torque) Series Frameless Servo Motor HT03812-E01. A high torque motor is employed and most often comprises at least 2 poles, at least 4 poles, at least 6 poles, at least 8 poles, and in preferred constructions 12 poles or more for increased torque output. The pole number of the motor components (e.g. the rotor, the stator) may vary to optimize the speed and torque range to the specific requirements of use. In certain constructions the motor is a 500 rpm DC brushless multiphase (e.g. 2-phase, 3-phase, or more) motor capable of torque output of at least 0.1 lb ft, at least 1 lb ft, at least 3 lb ft, at least 4 lb ft, at least 10 lb ft, at least 20 ft lb, at least 50 lb ft, and up to 100 lb ft or more.

The windings are optimized by the manufacturer for efficiency over a wide range of RPMs and torque. The windings are computer-modelled and wound by computer-control. This enhances performance for a low speed, low voltage, high torque, efficient BLDC (Brushless DC electric) motor. In some constructions, the motor is heavily wound with metal wire (e.g. copper, aluminum) to further reduce the eddy currents which result in inefficient magnetic fields and motor efficiency reduction. In a preferred construction the motor comprise a heavy copper winding design wherein the motor comprises at least 1 turn per coil, at least 2 turns per coil, at least 3 turns per coil, or preferably 5 turns per coil or more. In specific constructions, the heavy copper winding is defined by the amount of copper by weight; in some constructions the motor comprises at least 0.01 to 5 oz, 5 to 10 oz, 10 to 20 oz, 20 to 30 oz, or more than 30 oz of copper. In additional constructions, a larger diameter wire is selected for winding to reduce current losses preferably less or equal to 30 AWG, 26 AWG or less, 20 AWG or less, and most preferably 18 AWG or less.

In some constructions, a cylinder formed of a material such as a metal or metal alloy is placed in an oven or otherwise heated sufficiently to cause its inner diameter to expand. A stator is then inserted into the cylinder and the assembly is allowed to cool, thereby forming a shrink fit of the cylinder over the stator, such as for aluminum cylinder 108 over stator 106 as illustrated in FIGS. 1-2. In one preferred embodiment, the rotor is prepared with a hollow core, into which the drive shaft is snugly inserted, and glued, welded or otherwise fused to the interior surface of the rotor. A distal portion of the drive shaft passes from the rotor through the housing seal and the thrust bearing. The propeller is affixed directly to the distal portion of the drive shaft by mechanical or other means in most cases without an interceding gearing system.

An important aspect of the electric motors of the inventive thrusters is the minimal gap between the outer surface of the rotor and the inner surface of the stator. Small gap size reduces the volume of fluid within the gap and accompanying frictional drag of the fluid. However, too-small a gap increases the severity of the sheer profile and may lead to increased windage losses. On the other hand, there are inverse square field losses as the gap increases, therefore a smaller gap approaching the assembly tolerances of the motor rotor and stator without physical contact is preferred as a means to increase the torque output and the efficiency of the motor.

In most embodiments wobble as measured at one end of the rotor is within the range of 0.1 to 99 percent or preferably 0.1 to 75 percent, or more preferably 0.1 to 50 percent of the gap distance. Generally the wobble will be less than 95 percent or 90 percent of the gap distance, in some embodiments less than 85 percent, or less than 80 percent, or 70 percent. In still other embodiments, wobble is less than 40, 30, 20, or 10 percent of the gap distance. Typical strategies to minimize rotor wobble include the use of tight tolerance, high hardness output shaft and rotary bearings (either ball or roller bearings as appropriate, such as stainless steel or ceramic bearings obtainable from McMaster Carr and/or Ortec).

In certain embodiments, the rotor and drive shaft are continuous in construction while, in other embodiments, the drive shaft is rigidly affixed to an internal surface of the rotor. The inventive thrusters employ tightly toleranced and rugged bearings and seals for the motor and housing to minimize wobble according to industry best practices. In one alternative embodiment, a slightly compressible material is used to affix the drive shaft to the inner surface of the rotor to allow for damping of impacts to the drive shaft or propeller on the rotor.

The drive shaft extends from the rotor through the output cone, which serves as a rear or aft housing wall, and passes through a housing seal. The seal is positioned in the housing wall to maintain the internal fluid within the housing and to prevent water from the aqueous environment from entering the motor/thruster housing. It is preferred that the housing seal exerts minimal frictional force on the shaft. Accordingly the housing seal is generally of extremely light weight and meant to operate under a low pressure differential between inside and out. In one embodiment of the invention, so called "Crane seals," well known to practitioners are used as the preferred housing seal, such as illustrated in FIGS. 1-2 for Crane seal 146.

Any number of bearings may be used to support the rotor and/or drive shaft. In many embodiments of the invention, the rotor or rotor/drive shaft is supported at two points, such as by angular contact ball bearings 132 and 134, along the shaft on the proximal (inside of housing) side of the housing seal and one (e.g. thrust bearing 148) on the distal side of the seal, in the aqueous environment outside the housing wall.

A thrust bearing supporting the drive shaft is generally positioned outside the housing. Suitable thrust bearings include, thrust ball bearings, cylindrical thrust roller bearings, tapered roller thrust bearings, and spherical roller thrust bearings. In preferred embodiments the bearings are highly uniform and manufactured using tight specifications, are of minimum weight and of appropriate construction and materials to promote ruggedness and durability.

Any appropriate propeller may be used in the inventive thrusters. In fact, the thrusters used to produce the data in FIGS. 7 and 8A-8C, as described in more detail below in relation to Example I, employed low efficiency 3-bladed propellers normally used for propulsion in air (such as for a model airplane) as shown in FIGS. 3 and 4. Propellers may be of small diameter in design with a high angle of attack and have 1, 2, 3, 4, 5, or 6 or more blades. Particularly preferred are 5 or 6 bladed, large diameter, low friction-loss propellers. In one embodiment, propellers are manufactured by Torqeedo of Starnberg, Germany. Suitable propellers include: Mejzlik 220120, Mejzlik 321120, Torqeedo TOR-1901-00.

The components of the inventive thrusters are housed within a waterproof corrosion resistant housing formed of one or more components. Preferred thruster housings are made from light-weight plastic, metal, metal alloy, aluminium, ceramic, or carbon-based materials. In one embodiment thrusters are modular in design, and may have interchangeable rotor/stator pairs of the same diameters but different lengths, capable of being accommodated by a single sleeve within the housing. In this case, the longer rotor/stator is of higher power, but also higher weight and the shorter pair while of less power is also lighter weight. In one embodiment the thruster housing is prepared from a light weight plastic assembled with a shrink fit over an aluminum sleeve housing the stator. In another embodiment the housing utilizes a hydrodynamic end cap disposed on the end of the housing opposite from the propeller. The end cap incorporates a rubber bladder or other suitable pressure-maintaining accumulator device to ensure proper pressure balance in the presence of external pressures ranging from 1 atmosphere or less to 1,000, 5,000, 10,000 or 16,000 psi or greater, despite the compressibility differences between water and the internal thruster fluid(s). Preferably, the housing includes at least one quick disconnect port for filling and/or draining oil, and a vent and/or vent plug for air release while filling the thruster with fluid. In another embodiment the thruster comprises a subsea electrical connector attachment to receive electrical power from the vehicle to which it is attached.

Figure 8A:
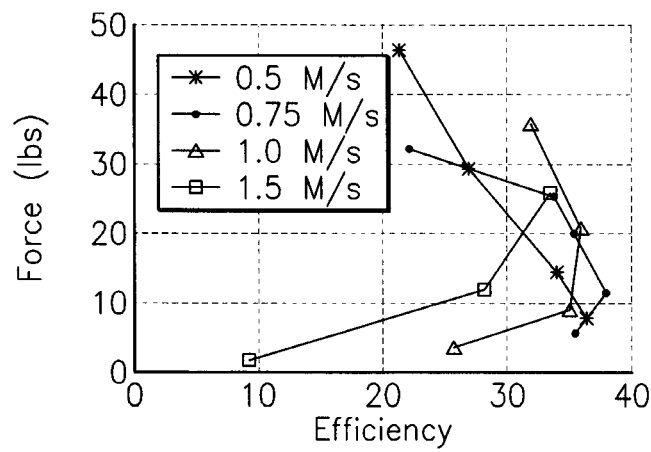
FIGS. 8A-8C are exemplary end-to-end efficiency plots relative to changes in force, torque command and RPM, respectively, for the thruster of FIGS. 1-5.
Figure 8B:
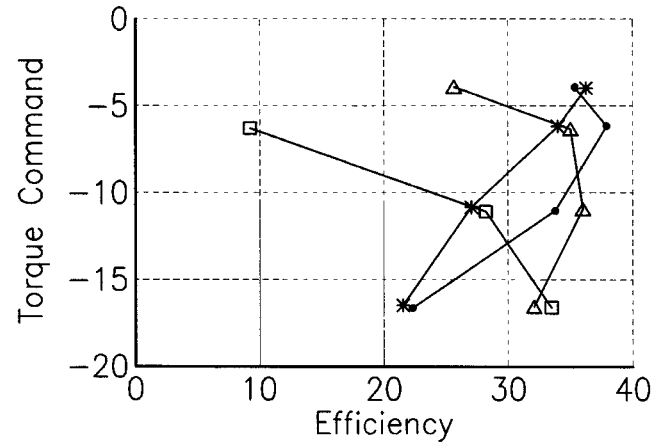
Figure 8C:
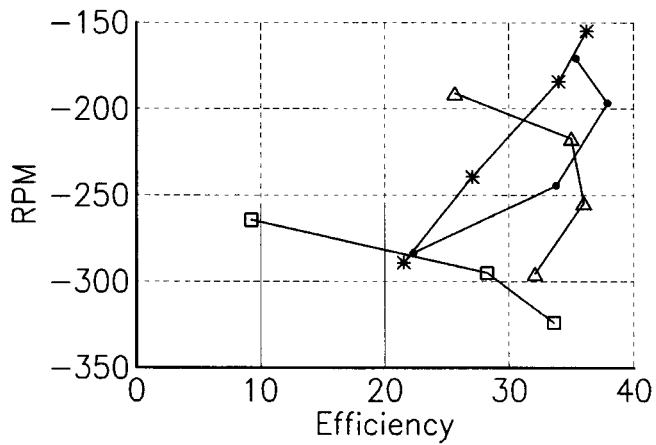

End-to-end efficiency for the inventive thrusters may be determined by standard Flume testing of thrusters. Results obtained for the inventive thrusters are shown in FIGS. 8A-8C. By these measurements, the inventive thrusters achieve efficiencies of greater than 20 percent across all velocities up to 0.5 m/s, 1 m/s, 2 m/s and greater than 3 meters per second.

In one embodiment the inventive thrusters achieve efficiencies greater than 25 percent across all velocities up to 0.5, 1, 2 and greater than 3 meters per second. In another embodiment the inventive thrusters achieve efficiencies greater than 30 percent across all velocities up to 0.5, 1, 2 and greater than 3 meters per second. In still another embodiment the inventive thrusters achieve efficiencies greater than 35 percent across all velocities up to 0.5, 1, 2, and greater than 3 meters per second. Another embodiment achieves thruster efficiencies greater than 40 percent across all velocities up to 0.5, 1, 2, 3, 4, 5, and greater meters per second. In another embodiment the inventive thrusters achieve efficiencies greater than 45 percent across all velocities up to 0.5, 1, 2, 3, 4, 5, and greater meters per second. In another embodiment the inventive thrusters achieve efficiencies greater than 35 percent across all velocities in the range of 0.1 to 3.5 meters per second. In another embodiment the inventive thrusters achieve efficiencies greater than 40 percent across all velocities in the range of 0.1 to 3.5 meters per second. In another embodiment the inventive thrusters achieve efficiencies greater than 45 percent across all velocities in the range of 0.1 to 3.5 meters per second. In another embodiment featuring a high efficiency Torqeedo 3 blade marine propeller, the inventive thrusters will achieve efficiencies greater than 50 percent across all velocities in the range 0.1 to 3.5 meters per second.

The inventive thrusters may be used on any marine vehicle but are particularly well suited for applications where minimum power consumption is required in conjunction with low speeds. Typical applications include propulsion for ROVs, HROVs, AUVs, mini-submarines and submarines. Additionally, the inventive thruster may be applied to submarine simulator decoys and torpedo decoys which generally need to move slowly and very efficiently for periods of time until signalled to move briefly at higher speeds.

Example I

Figure 7:
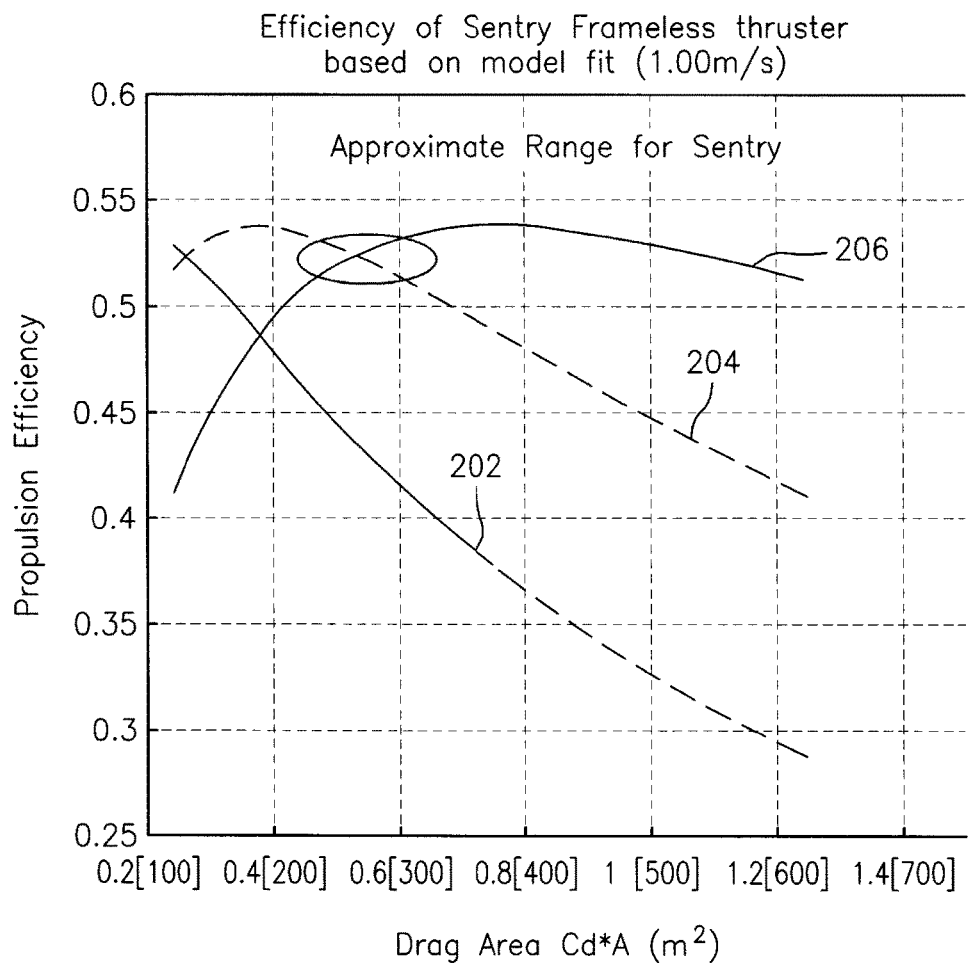
FIG. 7 is a chart of flume test data showing estimated vehicle efficiencies calculated from the results of efficiency testing of the inventive thrusters as estimated for the Sentry AUV.

This Example describes a direct drive thruster for medium endurance, battery powered vehicles such as Autonomous Underwater Vehicles (AUVs), Remotely Operated Vehicles (ROVs) and Hybrid Remotely Operated Vehicles (HROVs). The thruster utilizes a custom wound, brushless DC, frameless motor kit from a commercial motor supplier such as Allied Motion, Inc., as described above. The motor is designed to have a narrow form factor but long length. The computer controlled windings from the kit facilitate a relatively low speed operating point. The motor drives a propeller with high efficiency due to low friction losses, as shown in FIG. 7.

The Sentry AUV has a depth capability of 5,900 m (19,356 feet), a length of 2.9 m (144"), a height of 1.8 m (71"), a width of 0.8 m (31") without fins extended, and a width of 2.2 m (88") with fins extended. A typical weight for Sentry is 1,250 kg (2,750 lbs.). The hydrodynamic shape of Sentry enables fast ascents and descents, especially when powered by four brushless DC electric thrusters according to the present invention, with each thruster mounted on a pivoting wing.

The direct drive functionality allows for pressure tolerant motor operation using non-toxic, pressure-resistant low viscosity motor oil with only the addition of a Crane seal. The thrusters utilize a self-contained pressure compensation system and are connected to the motor controllers via a bulkhead connector making each thruster a fully stand-alone unit which is hot-swappable with any other thruster of similar design. Substantial effort is given to best practice in bearing and seal design and lightweight construction.

Direct drive thrusters comprising electric motors designed and assembled as described above and shown in FIGS. 1-5, have improved end-to-end efficiencies across the full range of speeds as determined in flume studies with isolated inventive thrusters as shown in FIGS. 7 and 8A-8C. To date, two series of thrusters in this same family have been constructed with different power output and operating points. Exemplary flume test data on efficiency and thrust is presented in FIGS. 7 and 8A-C.

The performance of several off-the-shelf propellers is compared in FIG. 7 which shows exemplary thruster data. The illustrated oval in FIG. 7 encompasses the approximate range for the Sentry AUV. Curves 202, 204 and 206 are based on propeller model no. Mejzlik 220120, Mejzlik 321120, Torqeedo TOR-1901-00. Flume test data showing estimated vehicle efficiencies was calculated from actual efficiency curves of the inventive thrusters and estimated values for the Sentry AUV.

Figure 11A:
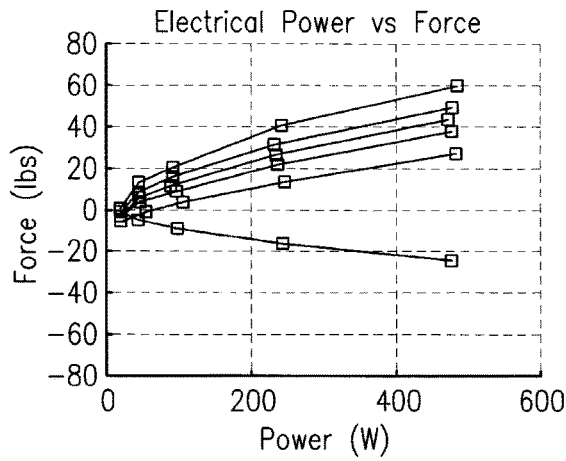
FIGS. 11A-11C are performance curves for a thruster according to the present invention utilizing a two-blade propeller.
Figure 11C:
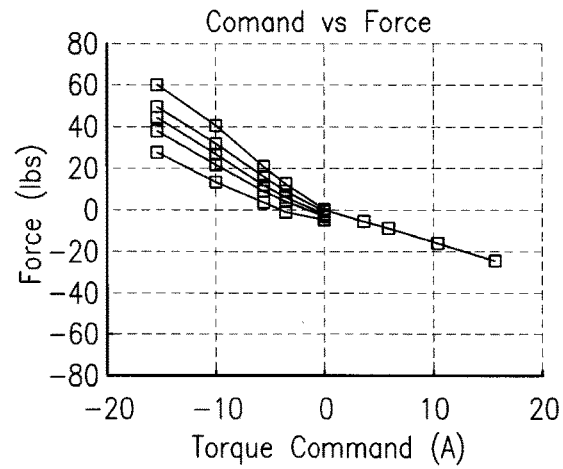
Figure 11B:
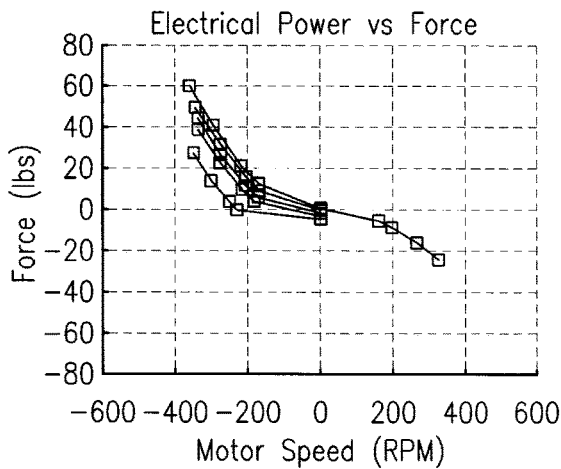

FIGS. 8A-C are exemplary end-to-end efficiency plots for thruster of FIGS. 1-5. Data are from Flume test studies for velocities of 0.5 m/s, 0.75 m/s, 1.0 m/s and 1.5 m/s as indicated by "*", "●", "Δ" and "□" symbols, respectively. FIGS. 11A-11C are performance curves for a thruster according to the present invention utilizing a two-blade propeller. The y-axis in each graph indicates force in pounds while the x-axes represent electrical power in watts, torque command in amps, and motor speed in revolutions per minute, respectively. The thruster exhibited a maximum efficiency of 45.78 percent, a Cart Speed of 0.75 m/s, a torque CMD of
−3.50 with supply amps of 0.87.

Figure 9E:
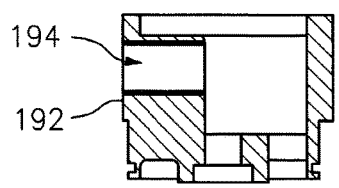
FIG. 9E is a schematic cross-sectional view along lines V-V of FIG. 9B.
Figure 9A:
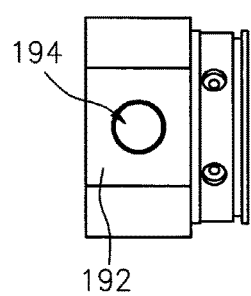
FIGS. 9A and 9C are schematic side views of the control side bearing support visible in FIGS. 1-3.
Figure 9B:
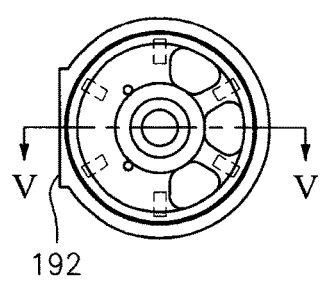
FIGS. 9B and 9D are schematic end views of the control side bearing support.
Figure 9C:
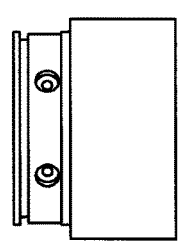
Figure 9D:
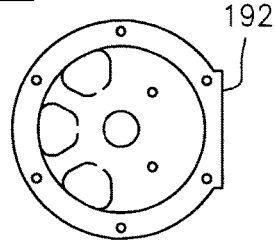
Figure 10C:
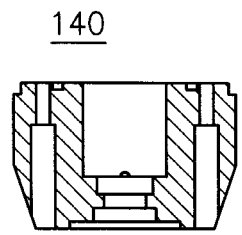
FIG. 10C is a schematic cross-sectional view along lines R-R of FIG. 10A.
Figure 10A:
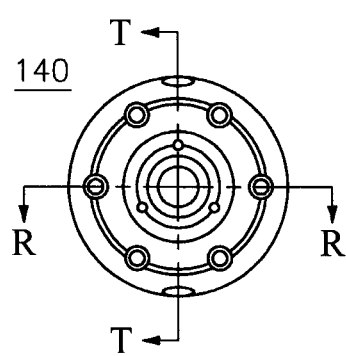
FIGS. 10A and 10B are schematic end views of the output cone visible in FIGS. 1-4.
Figure 10D:
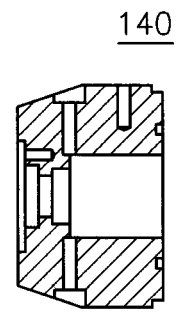
FIG. 10D is a schematic cross-sectional view along lines T-T of FIG. 10A.
Figure 10B:
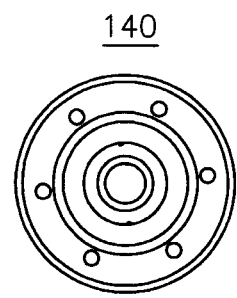

Returning to the embodiment illustrated in FIGS. 1-4, control side bearing support 112 is shown in more detail in FIGS. 9A-9E, with flat surface 192 and opening 194 into which a SubConn locking sleeve 190, FIGS. 2-4, is insertable. As shown in FIG. 9C, control side bearing support 112 has an outer diameter of 4.25 inches and an overall length of 3.23 inches in this construction. Output cone 140 is shown in more detail in FIGS. 10A-10D having an outer diameter of 4.0 inches, tapering in a rear-ward section to 3.19 inches in one construction.

Although specific features of the present invention are shown in some drawings and not in others, this is for convenience only, as each feature may be combined with any or all of the other features in accordance with the invention. While there have been shown, described, and pointed out fundamental novel features of the invention as applied to one or more preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A method of increasing the efficiency of a thruster submersible in a liquid environment, comprising:
   selecting a thruster including a housing, at least one propeller, and an electric motor, the motor having components including a drive shaft with a rotor and a stator matched to the rotor, the rotor and the stator being separated by a gap less than or equal to 1 mm, the motor being disposed in the housing to isolate the motor components from the liquid environment, movement of the drive shaft being constrained to a radial and axial play each of less than 1.0 mm, and a rear portion of the drive shaft extending through a shaft seal beyond the housing to drive at least one propeller within the liquid environment, wherein (i) the drive shaft is supported by at least three bearings, with at least one bearing supporting the drive shaft in front of the rotor and at least two bearings supporting the draft shaft behind the rotor, (ii) one of the at least two bearings behind the rotor is a thrust bearing disposed in the liquid environment, and (iii) the electric motor has a rated power; and operating the motor at an operating point less than 50 percent of the rated power of the motor in the liquid environment.

2. The method of claim 1 wherein the other of the bearings behind the rotor and not disposed in the liquid environment includes at least first and second thrust bearings supporting the drive shaft behind the rotor, wherein each said thrust bearing is disposed adjacent to the motor, and said first and second thrust bearings are separated from each other by less than 1 cm.

3. The method of claim 2 wherein the bearings are positioned to prevent fore and aft movement of the drive shaft and thereby to reduce efficiency loss.

4. The method of claim 1 wherein the motor is immersed in a working fluid that has compressibility of less than ten percent per thousand meters of seawater to depths of up to 4,000 meters.

5. The method of claim 4 wherein the rotor and the stator include windings, the working fluid is an oil, and the windings include an electrically non-conductive coating.

6. The method of claim 1 wherein the thruster is carried by a vehicle selected from the group including a Remotely Operated Vehicle, an Autonomous Underwater Vehicle, a Hybrid Remotely Operated Vehicle, a submarine, a mini-submarine, a submarine simulator decoy, and a torpedo decoy.

7. The method of claim 1 wherein the rotor has a ratio of length to diameter of greater than 2:1.

8. The method of claim 1 further including, during assembly of the thruster, thermally altering at least one dimension of at least one of (i) at least a portion of the housing and (ii) the stator to establish a shrink fit of the housing about the stator.

9. The method of claim 1 wherein the stator of the motor comprises a heavy copper winding of a copper wire of 20 AWG or less to reduce eddy currents.

10. The method of claim 4 wherein the working fluid is an oil and wherein the electric motor is a brushless DC motor.

11. The method of claim 4 wherein a self-contained pressure compensation system including a spring-loaded bladder within the housing maintains the working fluid at a positive pressure at depths up to 4,000 meters relative to the liquid environment.

12. An improved efficiency thruster submersible in a liquid environment, comprising:

an electric motor having components including a rotatable drive shaft with a rotor and a stator matched to the rotor, the rotor and the stator being separated by a gap, and the electric motor having a rated power;

a water-tight housing accommodating the motor and isolating the motor components from the liquid environment;

at least one shaft seal carrying the drive shaft and enabling it to extend distally beyond the housing while isolating a proximal remainder of the drive shaft and a working liquid from the liquid environment, the working liquid having compressibility of less than ten percent per thousand meters of seawater and retaining functionality at depths up to 4,000 meters;

at least three bearings supporting the drive shaft, with at least one bearing supporting the drive shaft in front of the rotor and at least two bearings supporting the draft shaft behind the rotor, one of the at least two bearings behind the rotor being a thrust bearing disposed in the liquid environment; and a propeller capable of being rotatably driven by the drive shaft within the liquid environment;

wherein movement of the drive shaft is constrained with radial and axial play each of less than 1.0 mm, the rotor has a ratio of length to diameter of greater than 2:1, and the gap between the rotor and matched stator is less than or equal to 1 mm, and said thruster configured to operate at an operating point less than 50 percent of the rated power of the motor in the liquid environment, and wherein said thruster is reversible to provide thrust in both forward and reverse directions.

13. The thruster of claim 12 wherein the motor is immersed in the working liquid.

14. The thruster of claim 12 wherein the working liquid is an oil and wherein the motor is a brushless DC motor immersed in the oil.

15. The thruster of claim 12 further comprising a self-contained pressure compensation system including a spring-loaded bladder within the housing which maintains the working liquid at a positive pressure relative to the liquid environment.

16. The thruster of claim 12 wherein the thruster is carried by a vehicle selected from the group including a Remotely Operated Vehicle, an Autonomous Underwater Vehicle, a Hybrid Remotely Operated Vehicle, a submarine, a mini-submarine, a submarine simulator decoy, and a torpedo decoy.

17. The thruster of claim 12 wherein the working fluid has compressibility of less than ten percent per thousand meters of seawater to depths of up to 11,000 meters.

18. The thruster of claim 12 wherein the other of the bearings behind the rotor includes at least first and second thrust bearings supporting the drive shaft behind the rotor, wherein each said thrust bearing is disposed adjacent to the motor, and said first and second thrust bearings are separated from each other by less than 1 cm.

19. The method of claim 1 wherein the motor is immersed in a working fluid that has compressibility of less than ten percent per thousand meters of seawater to depths of up to 11,000 meters.

* * * * *